Patented May 19, 1936

2,040,859

UNITED STATES PATENT OFFICE 2,040,859

COMPOUNDS OF THE ANTHRAPYRIMIDINE SERIES

Max Albert Kunz, Mannheim, and Karl Koeberle, Ludwigshafen-on-the-Rhine, Germany, assignors to General Aniline Works, Inc., New York, N. Y., a corporation of Delaware No Drawing. Application August 11, 1932, Serial No. 628,441. Renewed December 10, 1935. In Germany January 21, 1931

4 Claims. (Cl. 260—32)

The present invention relates to new compounds of the anthrapyrimidine series.

It is already known that 4-amino-1,9-anthrapyrimidine may be produced by treating 1,4-diaminoanthraquinone with formamide. 4-amino-1,9-anthrapyrimidine is a yellow crystalline powder which melts at 276° to 278° C., which is practically unvattable and has no affinity to the vegetable fibre.

We have now found that new valuable compounds of the anthrapyrimidine series are obtained by treating heteronuclear amidated anthraquinones in which at least one amino group is in the alpha-position with amides of monocarboxylic acids, especially formamide or by treating heteronuclear amino-alpha-acylaminoanthraquinones with ammonia; heteronuclear amidated anthraquinones are for example 1,5-, 1,6-, 1,7- and 1,8-diamino-anthraquinones and their derivatives. The resulting new compounds correspond to the general formula

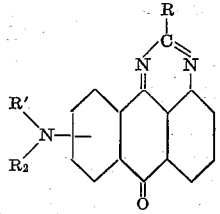

in which R, R₁ and R₂ stand for hydrogen, alkyl or aryl; they are readily vattable and some of them have the character of vat dyestuffs; they are important intermediate products for the production of dyestuffs; furthermore they produce clear, very fast and powerful dyeings on acetate silk. The first of the above mentioned reactions may be carried out with the addition of organic diluents, as for example phenol and its homologues, and may be accelerated by the addition of catalysts, as for example boric acid or anhydrous oxalic acid. In many cases, for example when the alpha-amino group is only capable of being converted into the pyrimidine ring with difficulty, it may be advantageous to use an excess of the acid amide, for example formamide, itself as a diluent. Instead of the amines, the corresponding heteronuclear mono or dialkyl or -arylamino-alpha-aminoanthraquinones may be employed. The acylamino-alpha-aminoanthraquinones of the said kind, when treated with formamide, yield the corresponding acyl derivatives of 1,9-anthrapyrimidine from which the acyl groups are split off by saponification, if desired in one operation with the condensation.

If other acid amides than formamide are employed Py-C-substituted anthrapyrimidines are obtained, for example Py-C-methyl compounds in case acetamide is used. Further anthrapyrimidines of the kind in question being substituted in the Py-ring may be obtained by treating the corresponding anthrapyrimidones with agents capable of replacing oxygen or hydroxyl groups by halogen as for example phosphorus pentachloride. In the Py-C-halogenanthrapyrimidines thus obtained the halogen atom can readily be replaced by organic radicles either directly by condensation with amino or hydroxy compounds, or by way of the corresponding diazo compounds which may be obtained from the amines prepared from the halogen compounds by heating them with ammonia. By way of the diazo compounds other substituents, such as mercapto, cyano and like substituents, can readily be introduced into the Py-C-position of the anthrapyrimidines.

The treatment of the heteronuclear amino-alpha-acylamino-anthraquinones in question or their N-alkyl or N-aryl derivatives with ammonia or its salts is preferably carried out in aqueous suspension under pressure, whereby in addition to ring closure in some cases the N-acyl groups not taking part in the ring closure are simultaneously saponified.

For example by heating 1-amino-5-benzoylaminoanthraquinone with formamide, 5-benzoylamino-1,9-anthrapyrimidine is obtained according to the following formulæ:

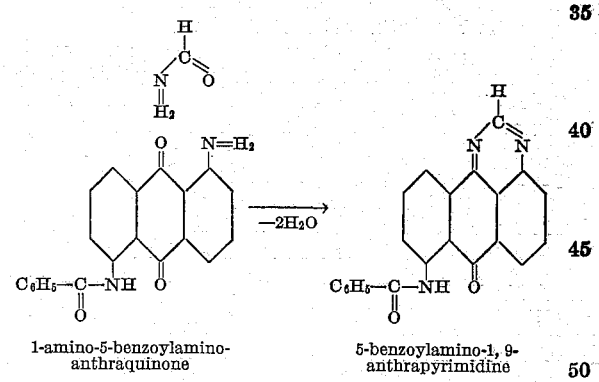

1-amino-5-benzoylamino-anthraquinone     5-benzoylamino-1, 9-anthrapyrimidine and when this is saponified, 5-amino-1,9-anthrapyrimidine is obtained.

The anthrapyrimidines obtainable according to the present invention may contain any substituent connected to the Py-C-atom, in particular halogen, alkyl, aryl, aralkyl, amino, substituted amino, hydroxy, alkoxy, nitro and cyano groups. The aforesaid anthrapyrimidines substituted on the Py-C-atom by organic radicals may be produced by employing another acid amide than formamide, for example acetic acid, for the condensation with an alpha-aminoanthraquinone. It is, however, more suitable to produce these substituted anthrapyrimidines from the corresponding anthraquinone-1(N),2-oxazoles by heating them with ammonia under pressure. A further convenient method for producing these substituted anthrapyrimidines consists in starting from the corresponding anthrapyrimidones which may also contain a nitro, alkyl, alkoxy, aryloxy group or a halogen atom in the anthraquinone nucleus, with agents capable of replacing oxygen or hydroxy groups by halogen, such as the halides of phosphorus or sulphur, for example phosphorus pentachloride, tribromide, trichloride, thionyl chloride and the like, or benzo trichloride, antimony pentachloride and arsenic pentachloride. In the Py-C-halogenanthrapyrimidines thus obtained the halogen atom can readily be replaced by organic radicals by the methods indicated above.

The following examples will further illustrate the nature of this invention but the invention is not restricted to these examples. The parts are by weight.

Example 1

25 parts of 1,5-diaminoanthraquinone are heated to boiling while stirring in 75 parts of formamide and 100 parts of phenol until a sample withdrawn and worked up melts at about 250° C. The whole is then allowed to cool, is diluted if necessary with methyl alcohol and the 5-amino-1,9-anthrapyrimidine formed is filtered off by suction. It is a brown red powder which dissolves in concentrated sulphuric acid giving a yellow orange coloration, yields an orange vat and dyes cotton therefrom blue red shades. When crystallized from organic solvents of high boiling point, or deposited from concentrated sulphuric acid by the careful addition of water, it separates in the form of violet to brown red small needles melting between 256° and 257° C.

The reaction may also be carried out in liquid carbolic acid (mixture of phenol and its homologues). In order to shorten the duration of the reaction, small amounts of anhydrous oxalic acid or boric anhydride may be added.

A product having the same properties is obtained from 1-amino-5-benzoylaminoanthraquinone by treatment with formamide and heating the resulting 5-benzoylamino-1,9-anthrapyrimidine dissolved in concentrated sulphuric acid to 120° C. with the addition of an amount of water necessary to saponify the benzoyl group (about $\frac{1}{10}$ of the amount of concentrated sulphuric acid employed). Tetrachloro-1,5-diaminoanthraquinone yields a 5-amino-1,9-anthrapyrimidine which contains chlorine.

10 parts of acetate silk are dyed for from ½ to ¾ of an hour at from 60° to 70° C. in a suspension of 0.1 part of the 5-amino-1,9-anthrapyrimidine obtained as described above in 300 parts of water after the addition of about 1 part of soap. The silk is then rinsed, washed and dried in the usual manner and a red dyeing having very good fastness properties is obtained. From 5-methylamino-1,9-anthrapyrimidine a reddish violet dyeing is obtainable. 5-gamma-propanolamino-1,9-anthrapyrimidine dyes acetate silk powerful Bordeaux red shades.

By the method described in the first paragraph of this example, 5-methylamino-1,9-anthrapyrimidine may be obtained from 1-amino-5-methylaminoanthraquinone, and a mixture of 5-amino-4- and -5-methoxy-1,9-anthrapyrimidine may be obtained from 1,5-diamino-4-methoxyanthraquinone, the two said products also being capable of dyeing acetate silk.

In a similar manner 1,8-diaminoanthraquinone yields 8-amino-1,9-anthrapyrimidine which is a brown powder dissolving in concentrated sulphuric acid to give an olive brown coloration, giving brown dyeings from a brown alkaline hydrosulphite vat and yielding red dyeings on acetate silk.

1-acetylamino-5-aminoanthraquinone, when heated to from 150° to 170° C. with ammonia under pressure, yields 5-amino-C-methyl-1,9-anthrapyrimidine which dyes acetate silk red shades.

Example 2

25 parts of 1,7-diaminoanthraquinone together with 100 parts of formamide are heated for several hours in 100 parts of boiling phenol. The mixture is then cooled to about 80° C., diluted with 200 parts of ethyl alcohol and the reaction product filtered off by suction. It is a brown powder which crystallizes in the form of blue red needles and dissolves in concentrated sulphuric acid giving a green yellow coloration. It dyes acetate silk orange red shades and gives an orange alkaline vat from which cotton is dyed bluish red shades.

Example 3

100 parts of 1,5-diaminoanthraquinone are heated with 150 parts of nitrobenzene, 50 parts of phenol, 200 parts of formamide and 10 parts of anhydrous cupric sulphate while stirring at 185° to 190° C. whereby the water formed during the reaction is distilled off. When a sample dissolved in sulphuric acid and precipitated by the addition of water separates in violet flocks the reaction mixture is allowed to cool and the solvents are distilled off by means of steam. The solid residue is filtered off from the remaining mass by suction and dried. The reaction product obtained has the same properties as the reaction product described in Example 1.

In order to purify the crude product 100 parts thereof are dissolved in 500 parts of 96 per cent sulphuric acid. Water is added until a concentration in sulphuric acid of 60 per cent results. The mixture is allowed to cool down to 20° to 30° C. and the undissolved matter is filtered off by suction and washed with 60 per cent sulphuric acid. Water is added to the filtrate and the precipitate is filtered off by suction, washed until it is neutral and dried.

If the reaction is carried out in nitrobenzene instead of a mixture of nitrobenzene and phenol it is advantageous to add a further 100 parts of formamide after 1 to 2 hours.

Example 4

100 parts of 1,8-diaminoanthraquinone are heated with 100 parts of nitrobenzene, 100 parts of phenol, 200 parts of formamide and 20 parts of boric acid at 185° to 190° C. while stirring and distilling off the water formed in the reaction. If a sample dissolved in sulphuric acid and precipitated by water separates in violet-blue flocks, the reaction mixture is allowed to cool and the crystalline 8-amino-1,9-anthrapyrimidine formed is filtered off by suction. It forms violet-red needles, dissolves in concentrated sulphuric acid giving a golden yellow color and gives a brown vat.

Example 5

100 parts of 1-amino-5-benzoylaminoanthraquinone are heated with 200 parts of formamide, 200 parts of phenol and 5 parts of ammonium vanadate for about 1½ hours at 180° C. to 190° C. Then 200 parts of water are added and the reaction product is filtered off by suction after cooling and washed with hot water to which advantageously a small quantity of caustic soda solution is added. The reaction product obtained in a nearly quantitative yield is 5-benzoylamino-1,9-anthrapyrimidine. The reaction product is then saponified, for example in the manner described in Example 1.

Instead of ammonium vanadate other catalysts may be employed, for example sodium vanadate, ammonium molybdate, cupric chloride, metal oxides such as cupric oxide, vanadium trioxide and pentoxide and metals as for example copper.

Also if nitrobenzene is employed instead of phenol, 5-benzoylamino-1,9-anthrapyrimidine is obtained, the reaction period being 2 hours.

Example 6

50 parts of 1,7-diaminoanthraquinone are heated with 100 parts of formamide, 100 parts of nitrobenzene and 5 parts of ammonium vanadate at 180° C. to 190° C. until the color of a sample dissolved in concentrated sulphuric acid does no longer change when formaldehyde is added. Then the reaction mixture is diluted at about 80° C. with 100 parts of alcohol. The reaction product is filtered off by suction and washed with alcohol and hot water; it is a brown crystalline powder. According to analysis and its properties the reaction product is 7-amino-1,9-anthrapyrimidine. After being recrystallized twice from trichlorobenzene its melting point is 278° to 281° C.; it dissolves in concentrated sulphuric acid giving a yellow color. If the sulphuric acid solution is diluted with water a violet sulphate is precipitated.

In a similar manner 6-amino-1,9-anthrapyrimidine may be produced from 1,6-diaminoanthraquinone.

The present application is a continuation-in-part of our copending application Ser. No. 586,692, filed January 14, 1932.

What we claim is:

1. Readily vattable compounds of the aminoanthrapyrimidine series which contain an amino group in a nucleus which has no part in the building up of the pyrimidine ring and which correspond to the general formula

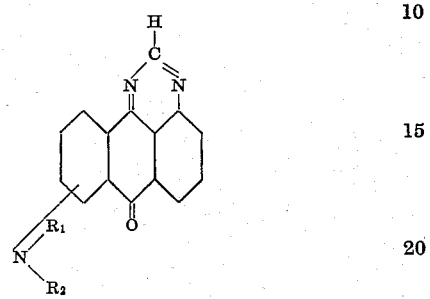

in which $R_1$ and $R_2$ stand for hydrogen or alkyl.

2. 5-amino-1,9-anthrapyrimidine crystallizing from high boiling organic solvents in the form of small violet to brown red needles, melting between 256° and 257° C., dissolving in concentrated sulphuric acid giving a yellow orange coloration, yielding an orange vat from which cotton is dyed blue red shades and dyeing acetate silk red shades of very good fastness.

3. 7-amino-1,9-anthrapyrimidine crystallizing from trichlorobenzene in the form of blue red needles, melting at 278° to 281° C., dissolving in concentrated sulphuric acid giving a green yellow solution from which a violet sulphate may be precipitated by the addition of water, dyeing acetate silk orange red shades and giving an orange vat from which cotton is dyed bluish red shades.

4. 8-amino-1,9-anthrapyrimidine, crystallizing in violet red needles, dissolving in concentrated sulphuric acid giving a yellow to brown color dyeing cotton brown shades from a brown vat and dyeing acetate silk red shades.

MAX ALBERT KUNZ.
KARL KOEBERLE.